United States Patent [19]

Suzuki et al.

[11] Patent Number: 4,925,437
[45] Date of Patent: May 15, 1990

[54] BELT TENSIONER DEVICE FOR LAWN MOWER

[75] Inventors: Takanori Suzuki; Kazuyoshi Takada, both of Iwata, Japan

[73] Assignee: Yamaha Hatsudoki Kabushiki Kaisha, Iwata, Japan

[21] Appl. No.: 324,615

[22] Filed: Mar. 16, 1989

[30] Foreign Application Priority Data

Mar. 17, 1988 [JP] Japan ................................ 63-64280

[51] Int. Cl.⁵ .............................................. F16H 7/12
[52] U.S. Cl. .................................................. 474/135
[58] Field of Search ........................ 474/101, 109–111, 474/113–115, 133, 135, 136, 138

[56] References Cited

U.S. PATENT DOCUMENTS 3,498,398  3/1968  Burrough et al. ............. 474/135 X
3,919,893  11/1975  Boehm et al. .................. 474/135 X
4,781,665  11/1988  Walker ............................ 474/135 X

*Primary Examiner*—Thuy M. Bui
*Attorney, Agent, or Firm*—Ernest A. Beutler

[57] ABSTRACT

A garden tractor or lawn mower including a belt driven mower blade and an improved tensioning arrangement for the driving belt. The tensioner mechanism provides a first range of tensioning during normal driving loads and a second, more rigid range of tensioning when abnormal loads are encountered so as to reduce belt wear but insure that the belt will not jump off of the driving or driven pulleys.

8 Claims, 5 Drawing Sheets

BELT TENSIONER DEVICE FOR LAWN MOWER

BACKGROUND OF THE INVENTION

This invention relates to an improved belt tensioner device and more particularly to a belt tensioner device of the type utilized in driving a lawn mower.

Flexible drives such as belts or chains are utilized for a wide variety of purposes. These drives have particular advantage in that they permit the drive to accommodate variations in path of relative movement between the driving member and the driven member. For example, frequently flexible drives are used to drive the mower blades of a riding type lawn mower or a lawn mower attachment for a riding tractor. Flexible drives are employed for transmitting the drive from an engine driven shaft to the mower driving shaft and these shafts may be supported for rotation about non-parallel axes. In conjunction with such arrangements, the mower actually may move relative to the body of the driving vehicle as the vehicle covers the terrain to be mowed. By employing a flexible drive, such relative movement is accommodated.

However, it is desirable to insure that the tensioning on the drive belt is maintained the same regardless of the relative position of the mower and its driving engine. Therefore, various forms of belt tensioners have been employed so as to insure such tensioning. In conjunction with the belt tensioner, it is desirable that it does not maintain too high a tensioning force because of the resulting wear and shortening of the life of the belts. When such degrees of relative movement are accommodated, the tensioning force should not be too great. However, there are conditions such as abrupt acceleration, deceleration or conditions which put a load on the driving belt which can cause it to become disengaged from the pulley under these extreme conditions.

It is, therefore, a principal object of this invention to provide an improved belt tensioner which will permit a relatively low, uniform tensioning force but which will also resist the abrupt change in tensioning due to sudden changes in driving or driven loads.

It is a further object of this invention to provide a tensioner for a flexible drive that will accommodate all conditions, not place undue tension on the flexible drive, but will insure that it does not become disengaged.

It is, therefore, a still further object of this invention to provide an improved belt tensioner that can provide variable tensioning forces depending upon the conditions encountered.

SUMMARY OF THE INVENTION

This invention is adapted to be embodied in a tensioner arrangement for a flexible drive that is comprised of a guide member that is engaged with the flexible drive and biasing means that acts upon the guide member for exerting a biasing force of a first magnitude during a first movement of the guide and a biasing force of a substantially greater magnitude upon movement of the guide in an amount greater than the first range.

DETAILED DESCRIPTION OF THE PREFERRED EMBODIMENT OF THE INVENTION

Figure 1:
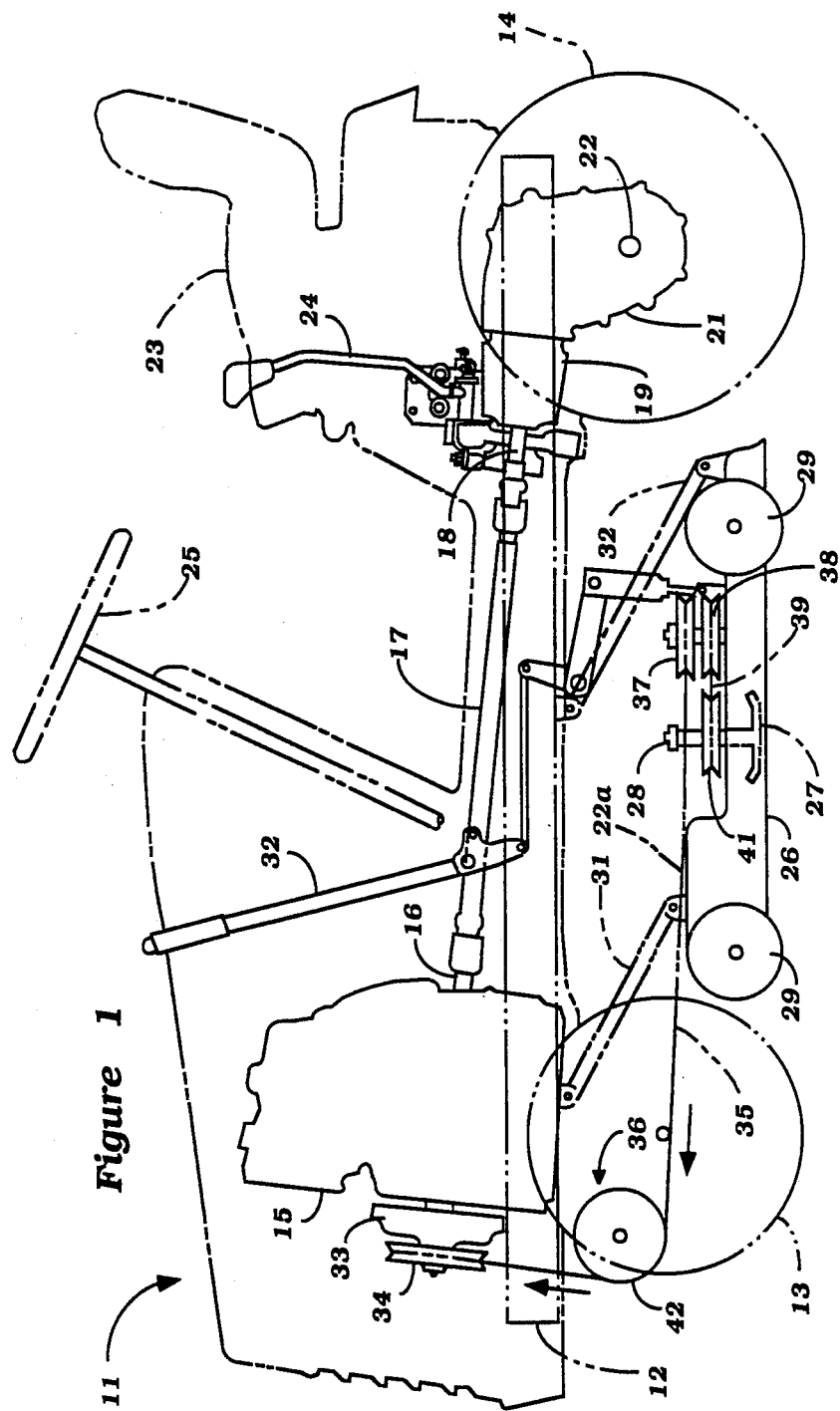
FIG. 1 is a side elevational view of a lawn mower or garden tractor driving a lawn mower attachment constructed in accordance with an embodiment of the invention. Portions of the tractor are shown in phantom.

Referring first primarily to FIG. 1, a garden tractor driving a lawn mower attachment or a riding lawn mower is identified generally by the reference numeral 11. Although the invention has particular utility in such applications, it is to be understood by those skilled in the art that the invention will have utility in other applications.

The lawn mower 11 is comprised of a frame assembly 12 that is supported for movement along the ground upon a pair of dirigible front wheels 13 and a pair of driven rear wheels 14. An internal combustion engine 15 which may be of any known type is supported in a suitable manner on the frame 12 and drives an output shaft 16 that is rotatable about a generally longitudinally axis relative to the frame 12. A propeller shaft 17 is drivingly coupled to the engine output shaft 16 and, in turn, drives an input shaft 18 of a hydrostatic transmission 19. The hydrostatic transmission 19 has an output shaft which drives a final drive assembly 21 for driving a rear axle 22 to which the rear wheels 14 are drivably coupled in a known manner.

A rider's seat 23 is supported on the frame 12 over the rear wheels 14 and in proximity to a transmission control shift lever 24 that can be employed for shifting the hydrostatic transmission 19 between a forward drive position, a neutral position and a rear drive position. In addition, a steering wheel 25 is supported forwardly of the rider's seat 23 for steering the front wheels 13 in a known manner.

In addition to powering the tractor 11, the engine 15 may be employed for driving an accessory such as a lawn mower attachment, indicated generally by the reference numeral 26. The lawn mower attachment 26 is comprised of a frame attachment in which one or more cutter blades 27 are supported for rotation about a vertically extending axis upon a mower shaft 28. The mower housing is supported for rolling movement along the ground on wheels 29. The mower attachment 26 is supported relative to the frame 12 by means of a parallel linkage system comprised of links 31 and 32 so that it may be lowered to ride on the ground via the wheels 29 or raised to an inoperative position. A control lever 32 operates through a linkage system so as to raise and lower the mower 26 in a known manner.

The mower blades 27 are driven from the engine 15 by means including an electrically operable clutch assembly 32 positioned at the forward end of the output shaft 16 for drivingly coupling the output shaft 16 to a driving pulley 34 that is fixed to the driven element of the clutch assembly 33.

Figure 2:
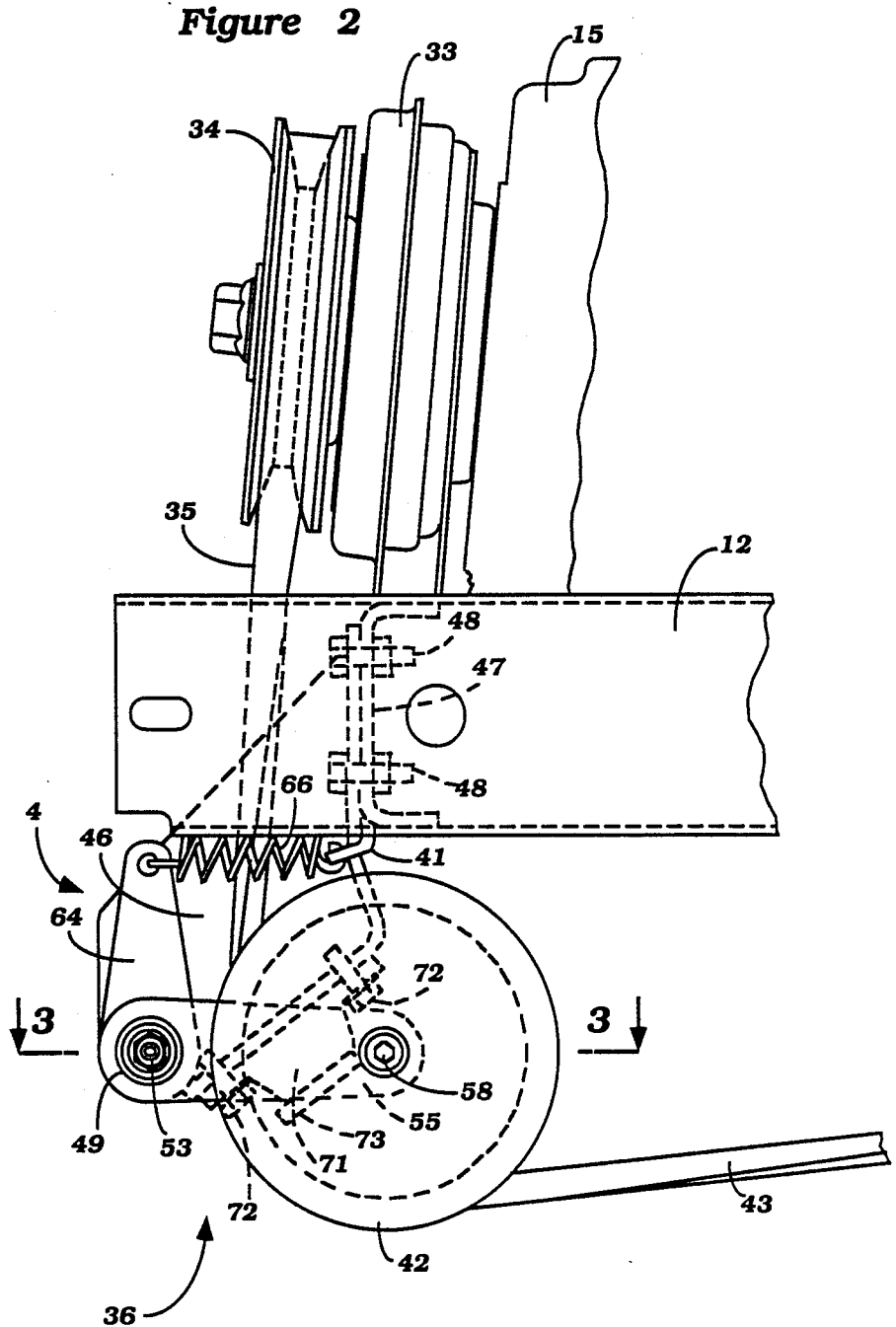
FIG. 2 is an enlarged side elevational view showing the belt tensioner mechanism.
Figure 3:
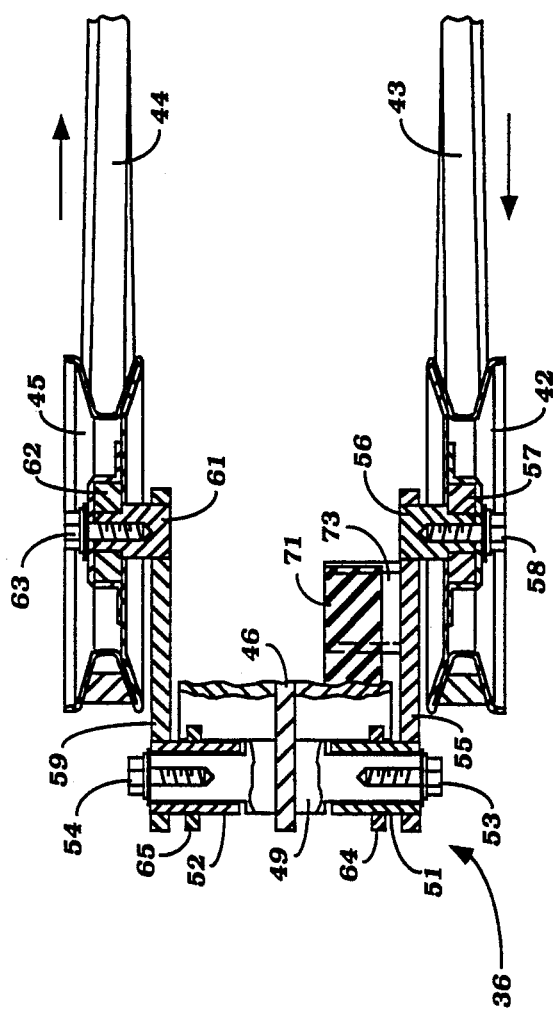
FIG. 3 is a cross-sectional view taken along the line 3—3 of FIG. 2.
Figure 4:
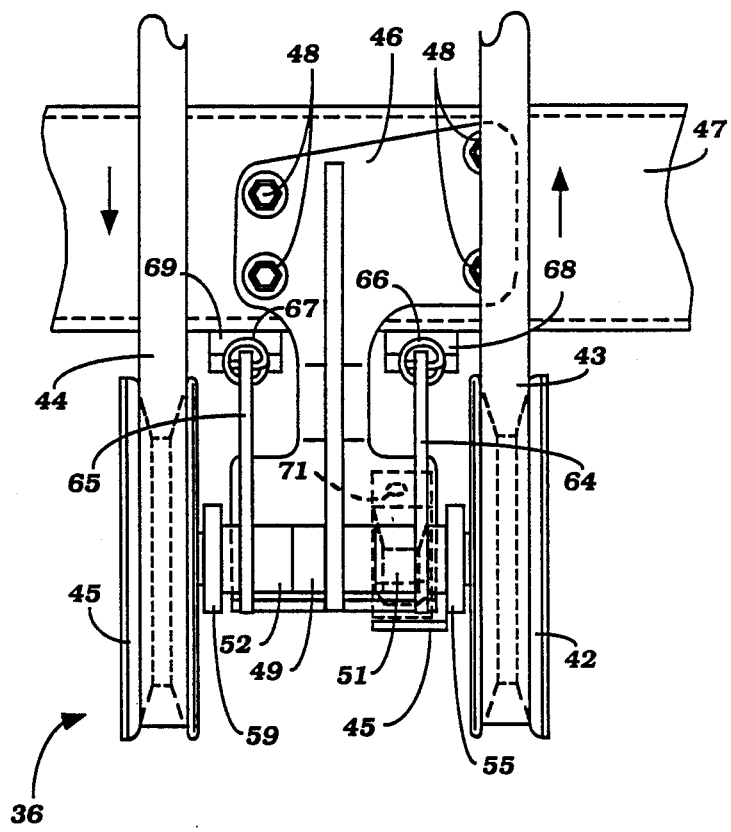
FIG. 4 is an end elevational view looking in the direction of the arrow 4 in FIG. 2.

A flexible belt 35 is trained over the driving pulley 37, a tensioner mechanism, indicated generally by the reference numeral 36 and illustrated in more detail in FIGS. 2 through 4, and a driven pulley 37 that is journaled on the mower housing. The driven pulley 37 is coupled to a second pulley 38 and a driving belt 39 transmits drive from the pulley 38 to a pulley 41 that is affixed to the mower shaft 28.

Referring now primarily to FIGS. 2 through 4, the tensioner mechanism 36, which forms the subject of the invention, will be described in detail. The tensioner mechanism 36 is comprised of a drive side pulley 42 that is rotatable about an axis that extends transversely to the axis of the pulley 34 and to that of the pulley 37. The pulley 34 has trained around it the driving flight 43 of the belt which transmits the driving forces to the driving pulley 37. A return flight 44 of the belt 35 is trained around a return pulley 45 that is journaled for rotation about an axis parallel to the axis of the drive pulley 42 and which returns the belt to the engine driven pulley 34.

The supporting and tensioning mechanism for the pulleys 42 and 45 includes a bracket assembly 46 that is mounted to a cross member 47 of the frame 12 by means of bolt and nut assemblies 48. The bracket assembly 46 carries a supporting shaft 49 at its lower end upon which supporting bushings 51 and 52 are rotatably journaled. The bushings 51 and 52 are axially fixed relative to the supporting shaft 49 by bolts 53 and 54. A first arm 55 is affixed to the outer end of the bushing 51 and carries a shaft 56 at its rearward end. The pulley 42 is journaled upon the shaft 56 by means of an antifriction bearing 57 and is held axially in place by a retaining nut 58. In a like manner, there is provided a support arm 59 that is affixed to the outer end of the bushing 56 and which carries a supporting shaft 61 upon which the pulley 45 is journaled by means of a bearing 62. The pulley 45 is held axially to the shaft 61 by means of a nut 63.

Figure 5:
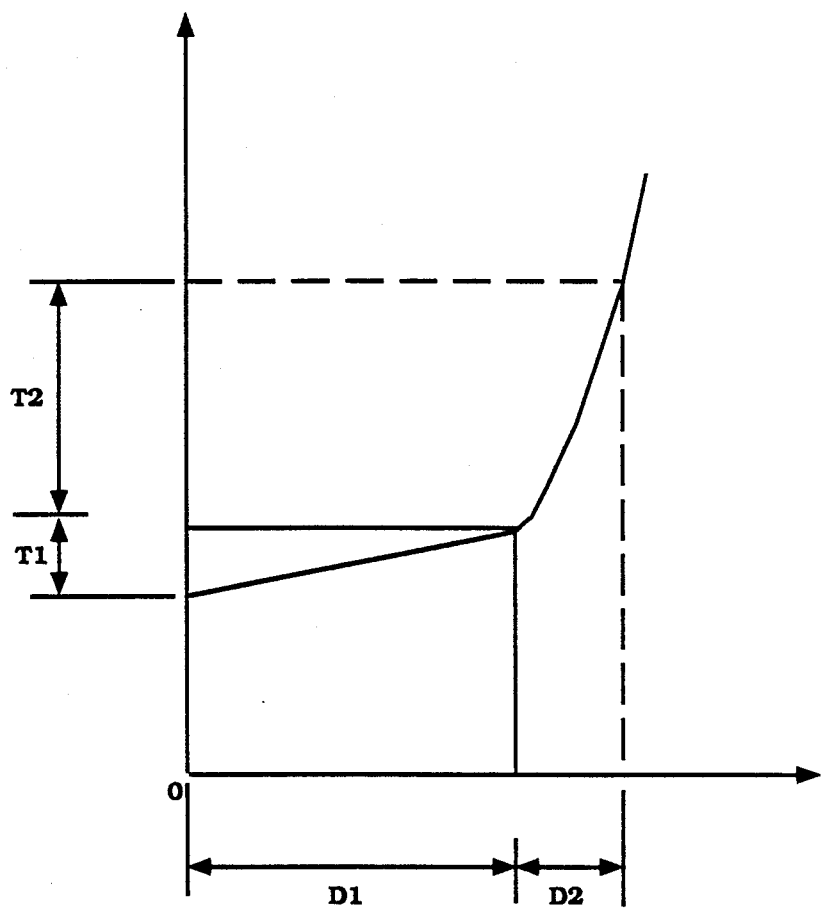
FIG. 5 is a graphical view showing the belt tensioning force in relation to the belt displacement.

For providing normal tensioning of the belt 35, there are provided a pair of control arms 64 and 65 which are affixed to the bushings 51 and 52 inwardly of the lever arms 55 and 59. Tension springs 66 and 67 are affixed at one end to the upper ends of the control arms 64 and 65, respectively. The opposite ends of the springs 66 and 67 are connected to brackets 68 and 69 which may be affixed to or form a part of the frame cross member 47. As a result, the action of the springs 66 and 67 will urge the control arms in a clockwise direction so as to cause like rotation of the supporting arms 55 and 59 and maintain a uniform tension on the driving belt 35. The degree of tension will depend upon the angular position of the control arms 64 as shown in FIG. 5 wherein the displacement of the control arms is indicated on the ordinate by the dimension D1 whereas the tension is indicated on the abscissa by the dimension T1. It will be seen that the effect is linear, as is well known with coil spring assemblies.

As the housing of the mower 25 moves up and down, the operation of the springs 66 and 67 will maintain a uniform tension on the belt 35. This tension is generally of a relatively low magnitude in order to insure that there will not be undue wear placed upon the belt 35. However, under sudden changes in load such as starting or stopping of the engine 15 or some impact condition on the mower blades 25, the force on the belt 35 can abruptly increase and the spring 66 and 67 may not be adequate to maintain the belt 35 in engagement with the pulleys under this condition. Therefore, there is provided a more rigid tensioning member which is comprised of an elastomeric block 71 that is affixed to the bracket 46 by means of bolts 72. The elastomeric block 71 is adapted to be engaged by a stop 73 formed on the supporting lever 55 when the position D1 is reached at the extreme upward condition. When this occurs, the block 71 will act in parallel with the springs 66 and 67 and provide a progressively increasing resistance to movement during the range of movement D2 which tension is shown by the line T2. As a result, the tensioner in effect provides two different rates; one relatively low rate during the normal range of angular movement and a substantially higher, more progressive rate at higher ranges of angular movement. This will insure that the belt is not unduly tensioned under normal running but will provide a resistance to the belt from jumping off of the pulleys under large loading.

As a result, it should be readily apparent that the device is particularly adapted for maintaining good tensioning under all conditions without adversely affecting the belt. In the illustrated embodiment, the tensioner is comprised of a pair of coil compression springs and an elastomeric spring. It should be readily apparent that other forms of spring arrangements can be employed so long as they provide the non linear characteristics as aforedescribed or, alternatively, a first range of tensioning under a first range of movement and substantially more rigid tensioning under a more extreme range of movement. Various other changes and modifications may be made without departing from the spirit and scope of the invention, as defined by the appended claims.

We claim:

1. A tensioner arrangement for a flexible drive comprising a guide member engaging said flexible drive and biasing means acting upon said guide member for exerting a biasing force of a first magnitude during a first range of movement of said guide and a biasing force of a substantially greater magnitude upon movement of said guide in an amount greater than said first range.

2. A tensioner arrangement as set forth in claim 1 wherein the biasing means exerts a linear resistive force during the first range of movement.

3. A tensioner arrangement as set forth in claim 2 wherein the biasing means exerts a progressively increasing resistive force upon movement outside of the first range of movement.

4. A tensioner arrangement as set forth in claim 1 wherein the biasing means includes a first linear spring acting within the first range of movement.

5. A tensioner arrangement as set forth in claim 4 wherein the biasing means further includes a non linear spring acting outside of the first range of movement.

6. A tensioner arrangement as set forth in claim 4 wherein the biasing means includes a coil spring acting in the first range of movement.

7. A tensioner arrangement as set forth in claim 6 wherein the biasing means further includes an elastomeric spring acting outside of the first range of movement.

8. A tensioner arrangement as set forth in claim 1 wherein the biasing means comprises a guide supported for pivotal movement about an axis.

* * * * *